United States Patent [19]
Dinstein

[11] 4,151,550
[45] Apr. 24, 1979

[54] DPCM PREDICTORS FOR NTSC COLOR COMPOSITE TV SIGNALS USING PHASE ADJUSTMENT OF SAMPLING

[75] Inventor: Its'hak Dinstein, Gaithersburg, Md.

[73] Assignee: Communications Satellite Corporation, Washington, D.C.

[21] Appl. No.: 806,431

[22] Filed: Jul. 7, 1977

[51] Int. Cl.² ............................................. H04N 9/02
[52] U.S. Cl. ..................................................... 358/13
[58] Field of Search ................................... 358/12, 13

[56] References Cited
U.S. PATENT DOCUMENTS
4,037,248  7/1977  Iijima et al. .............................. 358/13

Primary Examiner—Robert L. Richardson
Attorney, Agent, or Firm—Sughrue, Rothwell, Mion, Zinn and Macpeak

[57] ABSTRACT

NTSC color composite signals are sampled at any frequency $f_s$, which is a rational multiple of the color subcarrier frequency, and the phase relationship between samples of adjacent lines can be adjusted in increments smaller than the sampling period so that the distance between corresponding samples in adjacent lines is minimized.

10 Claims, 7 Drawing Figures

DPCM PREDICTORS FOR NTSC COLOR COMPOSITE TV SIGNALS USING PHASE ADJUSTMENT OF SAMPLING

BACKGROUND OF THE INVENTION

This invention relates to differential pulse code modulation (DPCM) of NTSC color composite TV signals, and more particularly, to predictors used in the DPCM process.

In any digital encoding system, it is important that the coded signal should represent an analogue signal from which it is derived as closely as possible with a minimum of redundancy, so as to economize on the bandwidth of any channel over which the signal is to be transmitted. One of the most efficient methods of transmission is a process known as Differential Pulse Code Modulation (DPCM) in which, instead of digitizing the instantaneous value of the signal, the difference between the instantaneous signal value and a previous value of the signal is digitized. DPCM is generally classified as a "predictive" type of encoding in that it exploits the predictability, i.e., redundancy, of a signal to achieve a reduced digit rate for pulse code modulation (PCM) transmission.

Shown in FIG. 1 is a block diagram of a typical DPCM system having a transmitter 1 and receiver 11. As shown therein, the analog information signal at terminal 2 is sampled in analog-to-digital convertor 3 controlled by sampling pulses from timing control 5. The current digitized sample is supplied to a subtractor 7 where it is compared to a predicted value of that sample and the difference between the actual and predicted values is quantized in quantizer 9. The quantized difference signal is fed to an adder 13 where the current sample is then reconstructed by adding the difference signal and predicted value. The reconstructed sample is then fed to shift registers SR1-SRN having different lengths and is advanced through the shift registers under control of the same sampling pulses as are fed to A/D converter 3 from timing control device 5. Since the shift registers are of unequal lengths, N different reconstructed samples are present at their output terminals at any given time. These N reconstructed samples are multiplied by weighting co-efficients $\alpha_1 - \alpha_N$ and are combined in adder 15 to obtain the predicted value for the current sample. The quantized difference signal from the quantizer 19 is also sent to the receiver 11 where it is combined in adder 17 with the predicted value of that sample. The reconstructed sample value is then supplied simultaneously to digital-to-analog converter 4 and shift registers SR21-SR2N. Digital-to-analog converter 4 reconverts the video signal to its original analog form and shift registers SR21-SR2N store the reconstructed samples to be used by weighting means $\alpha_{21} - \alpha_{2N}$ and adder 19 to provide predicted sample values identical to those obtained in the transmitter 1. Shift registers SR21-SR2N and weighting means $\alpha_{21} - \alpha_{2N}$ are identical to their counterparts in the transmitter 1. While FIG. 1 shows the different parts in the receiver to be controlled by timing control device 5, it should be understood that this is for illustrative purposes only, and that in reality the timing control signals for the receiver will be obtained from the transmitter, e.g., they may be derived from the bit rate of the DPCM signals so that the timing control pulses at the receiver are identical in phase and frequency to the timing signals used in the transmitter.

For a monochrome television signal redundancy is high, as is evidenced by its signal power spectrum which has a predominance of energy at low frequencies. Predictability of monochrome signals is high since most television signals contain large areas of constant or near-constant brightness; i.e., given the amplitude of any signal sample there is a high probability that the following sample will have very nearly the same value.

The National Television Standard Committee (NTSC) color television system uses the same luminance signal as in the monochrome system, and transmits the color, or chrominance, in the form of a 3.58 MHz phase-and-amplitude-modulated color subcarrier signal modulated onto the luminance signal. The presence of the color subcarrier imposes considerable difficulties on the design of predictors for DPCM of composite signals since even within regions of uniform luminance the value of the sampled picture elements (pels) varies according to the color subcarrier. One method of predicting the color composite signal is to use as a prediction a previous sample having the same color subcarrier phase as the pel to be predicted. It is advantageous to select this sample from a point in the field as close as possible to the pel to be predicted in order to minimize the probable variance of the luminance signal. This can be more clearly understood by referring to FIG. 2 which illustrates the spatial distribution and phase relationship of color subcarrier samples from adjacent field lines for a sampling rate of 10.7 MHz (3 times the subcarrier frequency). The waveforms in FIG. 2 represent the color subcarrier in adjacent lines of the TV field, and the dots on the waveforms represent the sampling times. As shown therein, the minimum possible distance $d_1$ between samples of the same line having the same subcarrier phase is the distance corresponding to one period of the subcarrier. In order to obtain this distance between samples, the sampling rate should be an integral multiple of the subcarrier frequency, $f_{sc}$. The most common sampling rate is $3f_{sc} = 10.7$ MHz since it is the lowest integral multiple of the subcarrier frequency above the Nyquist rate (8.4 MHz) for the color composite signal. If a sample from a previous line is to be used, the minimum possible distance $d_2$ between samples having the same subcarrier phase is the vector sum of the distance $d_3$ between the lines and the distance $d_4$ corresponding to half a period of the subcarrier. This is due to the fact that the subcarrier frequency is an odd multiple of half the line frequency and, therefore, the subcarrier signals on adjacent field lines are always 180° out of phase. As shown in FIG. 2, a sampling rate of $3f_{sc}$ is also compatible with the selection of samples from previous lines.

The disadvantage of this sampling rate is its inefficiency. The bandwidth of the NTSC color composite video is 4.2 MHz, and $3f_{sc} = 10.7$ MHz is far above the required Nyquist rate (8.4 MHz).

One method of sampling at a rate other than 3 times the subcarrier frequency is described in U.S. Pat. No. 3,891,994. According to that method, the color signal from a previous field line is sampled at a rate which is n/m times the subcarrier frequency, where n and m are both small integers. The samples are then fed into a plurality of shift registers having different lengths, so that for any given sampling frequency the proper combination of shift registers outputs can be selected to provide the samples from the previous line having the same subcarrier phase. For a sampling rate of n/m times the subcarrier frequency, a complete cycle of sampling will extend over m subcarrier periods and, since the subcarrier signals on adjacent field lines are 180° out of phase, a co-phased sample from the preceding line can always be found within a distance of ±m/2 subcarrier periods. It can be shown that for m = 1 or 2, a co-phased sample from a preceding line can always be found at $-\frac{1}{2}$ of the subcarrier cycle, thereby obtaining the minimum distance $d_2$ shown in FIG. 1. However, this limitation on the value of m limits severely the desirable range of sampling frequencies. For a Nyquist rate of 8.4 MHz, there is only one available sampling rate, i.e., (5/2) $f_{sc}$, above the Nyquist rate and yet below the inefficient sampling rate of $3f_{sc}$.

There is, therefore, a need for a method of predicting color composite TV signals in which the distance between co-phased samples can always be kept at a minimum, and which provides a greater flexibility in the selection of the sampling rate so that the efficiency of the TV signal transmission system may be maximized.

SUMMARY OF THE INVENTION

According to the method of the present invention, the color composite TV signal is sampled at a rate $f_s = (n/m) \times f_{sc}$, where n and m are integers and n is even. The phase of the samples between adjacent field lines are shifted in increments of 1/m sampling periods so that for a wide variety of sampling rates, the desired phase relationship between samples of adjacent lines may be maintained. According to one prediction method, the phase relationships of samples from adjacent field lines are adjusted in order to minimize the distance between co-phased samples, and according to a second prediction method the phases of the samples are adjusted in order to vertically align samples from adjacent lines.

DETAILED DESCRIPTION OF THE PREFERRED EMBODIMENT

The purpose of the present invention is to provide methods of predicting NTSC color composite signals using sampling rates lower than 10.7 MHz ($3f_{sc}$) while at the same time maintaining the advantageous phase relationships provided by the $3f_{sc}$ sampling rate. Accordingly, two DPCM predictors will now be described which can process NTSC color composite signals sampled at any frequency $f_s$ which is a rational multiple of the color subcarrier frequency, $f_{sc}$. More specifically, $f_s = (n/m) \times f_{sc}$, where n and m are integers, and n is even.

As discussed above and shown in FIG. 2, predictors using co-phased samples are most accurate when the minimum possible distance is maintained between samples. Thus, known predictors using co-phased samples have been limited to operating at sampling rates of $3f_{sc}$, since this has been the lowest available frequency at which the minimum distance could be obtained. A method of obtaining the phase relationships shown in FIG. 2 will not be described for sampling rates other than $3f_{sc}$.

Figure 2:
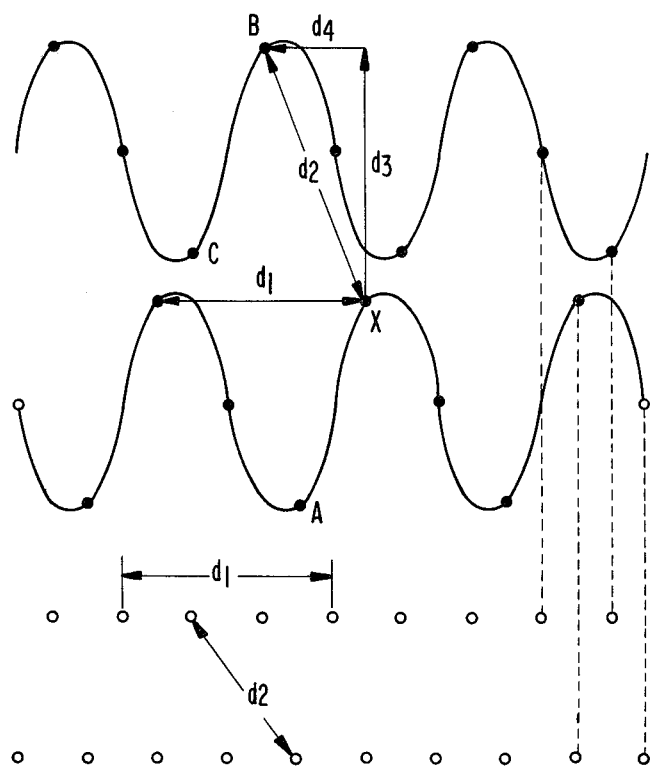
FIG. 2 illustrates the spatial distribution and phase relation between samples of adjacent field lines for a sampling rate of $3f_{sc}$.

The first predictor according to the present invention requires the phase adjustment of samples from adjacent field lines so that the distance between samples having the same subcarrier phase is minimized, as discussed above and illustrated in FIG. 2. As shown in FIG. 2, samples X and A have the same subcarrier phase as samples B and C, respectively. Tests have shown that the value of a current sample X can be accurately predicted according to the following computation:

$$\hat{X} = B + \tfrac{1}{2}(A-C) \qquad (1)$$

where $\hat{X}$ is the predicted value of pel X, and B, A and C are the reconstructed values of the samples taken at pels B, A and C, respectively. Each of the reconstructed values can be expressed in the form of a luminance component and a chrominance component. Since pels A and C have the same subcarrier phase, we can assume that in Equation (1) their chrominance components will cancel each other so that Equation (1) can be expressed as $$\hat{X} = Y_B + \tfrac{1}{2}(Y_A - Y_C) + D\sin\phi = B + \tfrac{1}{2}(Y_A - Y_C) \qquad (2)$$

where $Y_i$ is the luminance of pel i and $D\sin\phi$ represents the amplitude and phase of the subcarrier at pel B. By selecting pels which are as close as possible to each other, we can approach the ideal condition in which the luminance components of all pels are equal and Equation (2) is reduced to $\hat{X} = B$. However, the term $\tfrac{1}{2}(Y_A - Y_C)$ will account for small variances in the luminance signal between lines.

Figure 1:
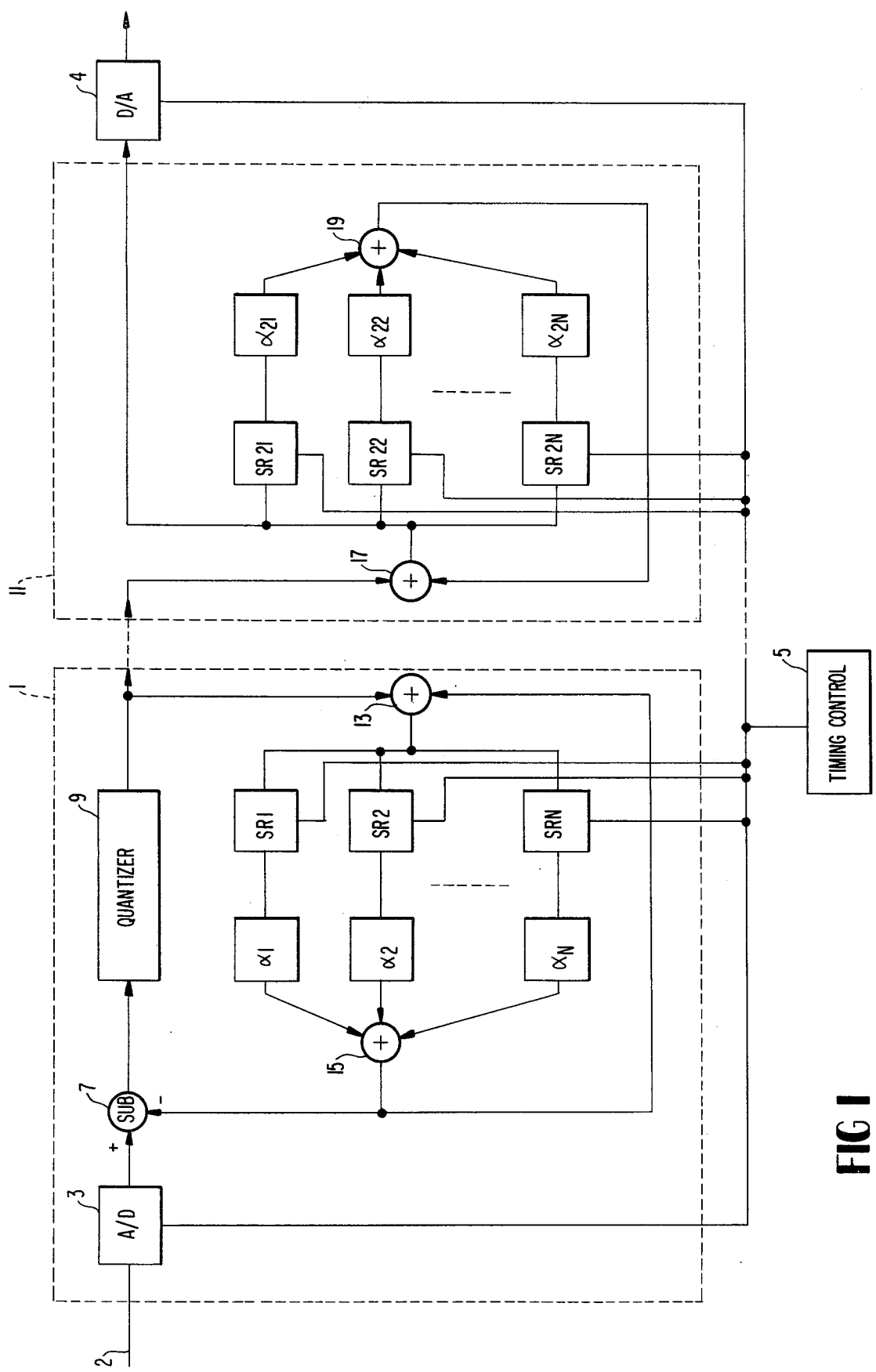
FIG. 1 is a block diagram of a DPCM transmission system in which the present invention may be utilized.

Equation (1) can be realized in the system of FIG. 1 by providing three shift registers SR1 - SR3, where SR1 is a 1-bit shift register for storing only the reconstructed value of sample A, SR2 is a (SL+2)-bit shift register (SL, discussed below, is the number of samples per line) for providing the reconstructed value of sample B, and SR3 is a (SL+3)-bit shift register for providing the reconstructed value of sample C. Co-efficients $\alpha_1$–$\alpha_3$ are then set equal to $\tfrac{1}{2}$, 1 and $-\tfrac{1}{2}$, respectively.

Figure 3:
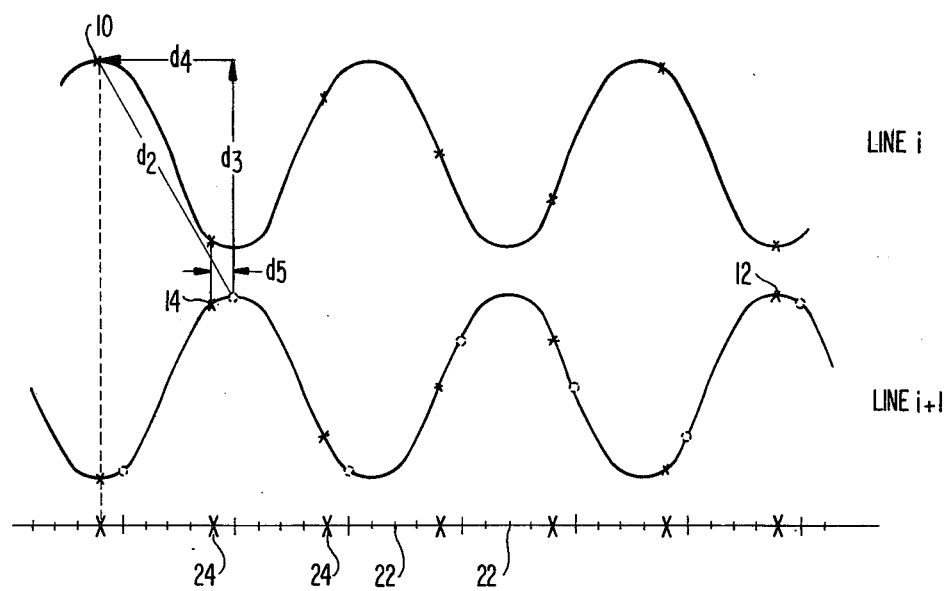
FIG. 3 illustrates the spatial distribution and phase relation of samples from the adjacent field lines for a sampling rate of (12/5) × $f_{sc}$ before and after adjusting the phase of the samples according to the method of the present invention.

FIG. 3 illustrates the spatial distribution and phase relation between samples from adjacent field lines for a sampling rate of (12/5) × $f_{sc}$. Note that twelve timing pulses 22 occur during each subcarrier period with a sampling pulse 24 occurring at every fifth timing pulse, thus a sampling rate of (12/5)$f_{sc}$. For the sake of clarity, only three periods of the subcarrier are shown for each line, although it should be understood that for a sampling rate of (12/5)$f_{sc}$ a complete sampling cycle will require five subcarrier periods. The "x"s in FIG. 3 indicate samples which would be taken without utilizing the sampling method of the present invention, e.g., according to the method described in U.S. Pat. No.

3,891,994, discussed above. Note that the minimum horizontal distance between two samples at the same subcarrier phase is two and one half subcarrier periods. For example note the distance between 10 on line i and sample 12 on line i+1. Due to this increased distance, a sampling rate of $(12/5)f_{sc}$ will not provide predictions as accurate as those for $3f_{sc}$. However, if all of the samples on line i+1 were shifted by a distance $d_5$, each of the samples on line i+1 would occur at the pels marked "0" and co-phased samples on adjacent lines i and i + 1 would then be separated by the minimum possible distance discussed above, e.g., sample 14 delayed by an increment $d_5$ would be separated from sample 10 by a distance $d_2$ equal to the vector sum of the inter-line distance $d_3$ and a distance $d_4$ equal to one half the subcarrier period. Similarly, it will be necessary to further delay the sampling pulses on line i+2 by a distance $d_5$ in order to achieve the proper phase relationship between the samples on lines i+1 and i+2. Thus, the sampling pulses on each succeeding line will be delayed by an additional $d_5$ with respect to the times at which those samples would have occurred without utilizing the present invention until at line i+6 the samples are vertically aligned with the samples on line i and the cycle is repeated.

Figure 4:
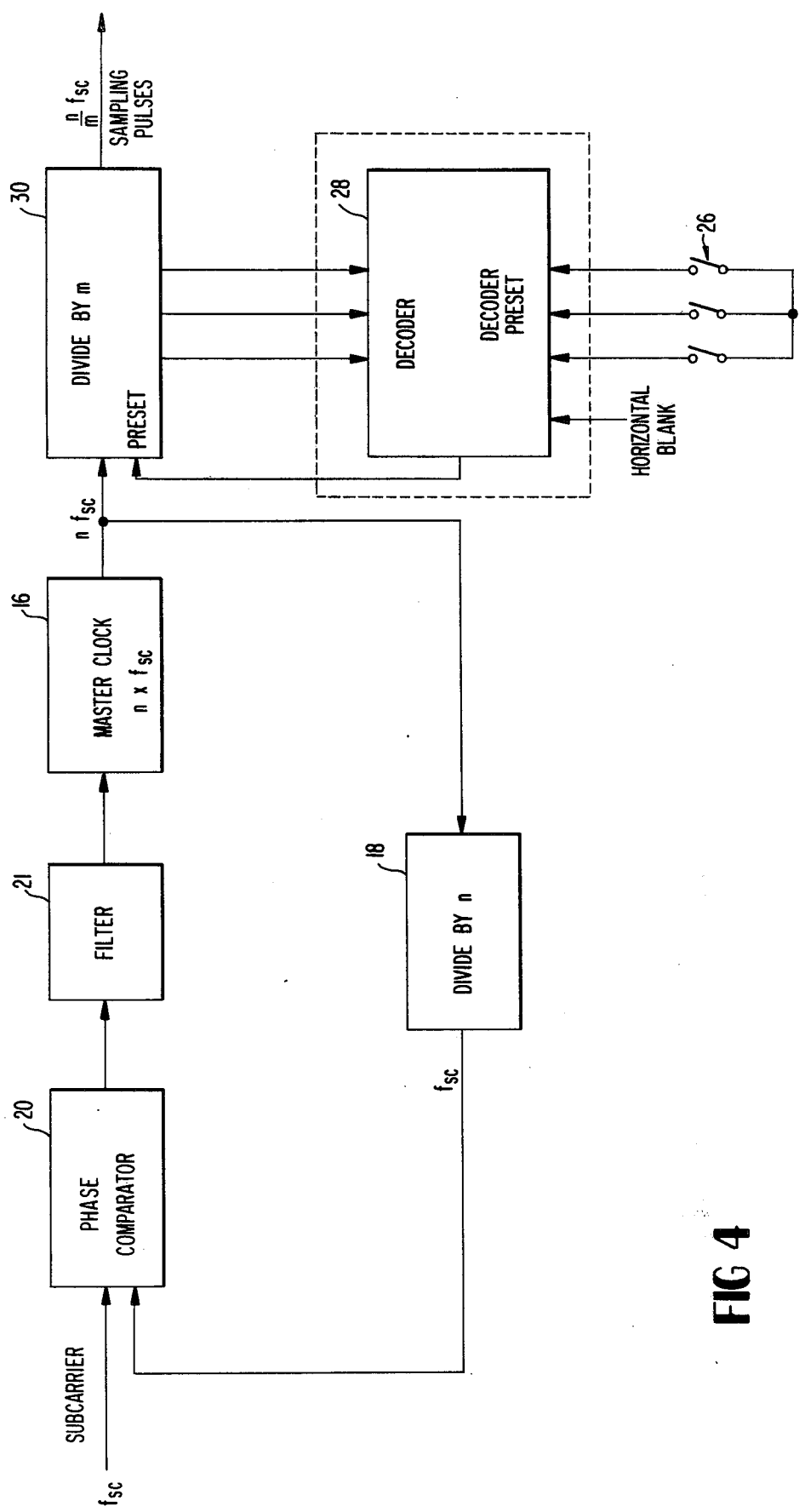
FIG. 4 is a block diagram of a circuit to be used in phase shifting the sampling pulses shown in FIGS. 2 and 6.

FIG. 4 is a block diagram of an apparatus for performing the phase shifting of the samples as shown in FIG. 3. The phase shifter includes a master clock 16 for providing master clock pulses at a frequency of $nf_{sc}$ which is phase locked to the subcarrier frequency $f_{sc}$ by means of divider 18, phase comparator 20 and filter 21 in a manner well known in the art. A "divide by m" counter receives and accumulates the master clock pulses, providing one output pulse for m input pulses. Thus, the output pulses are at the sampling pulse rate of $(n/m)f_{sc}$. The master clock pulses are shown at 22 in FIG. 3 and the sampling pulses are shown at 24 for a sampling rate of $(12/5)f_{sc}$. In order to phase shift the sampling pulses of line i+1 by an increment of k master clock periods, the preset switch 26 can be set to the binary equivalent of the desired number k so that preset logic 28, enabled once every horizontal blanking period, will preset the "divide by m" counter so that the first sampling pulse of line i+1 will not occur until (m+k) master clock pulses have been received. Thereafter, each of the sampling pulses on line i+1 will occur every m clock pulses so that each of the sampling pulses on line i+1 will be phase shifted by k clock pulses with respect to the sampling pulses on line i. In order to incorporate the phase-shifting apparatus of FIG. 4 into a conventional DPCM system, one need only replace the timing control device 5 in FIG. 1 with the phase-shifting apparatus of FIG. 4 so that the entire DPCM system is controlled by the sampling pulses from the divide by m counter 30.

Figure 7:
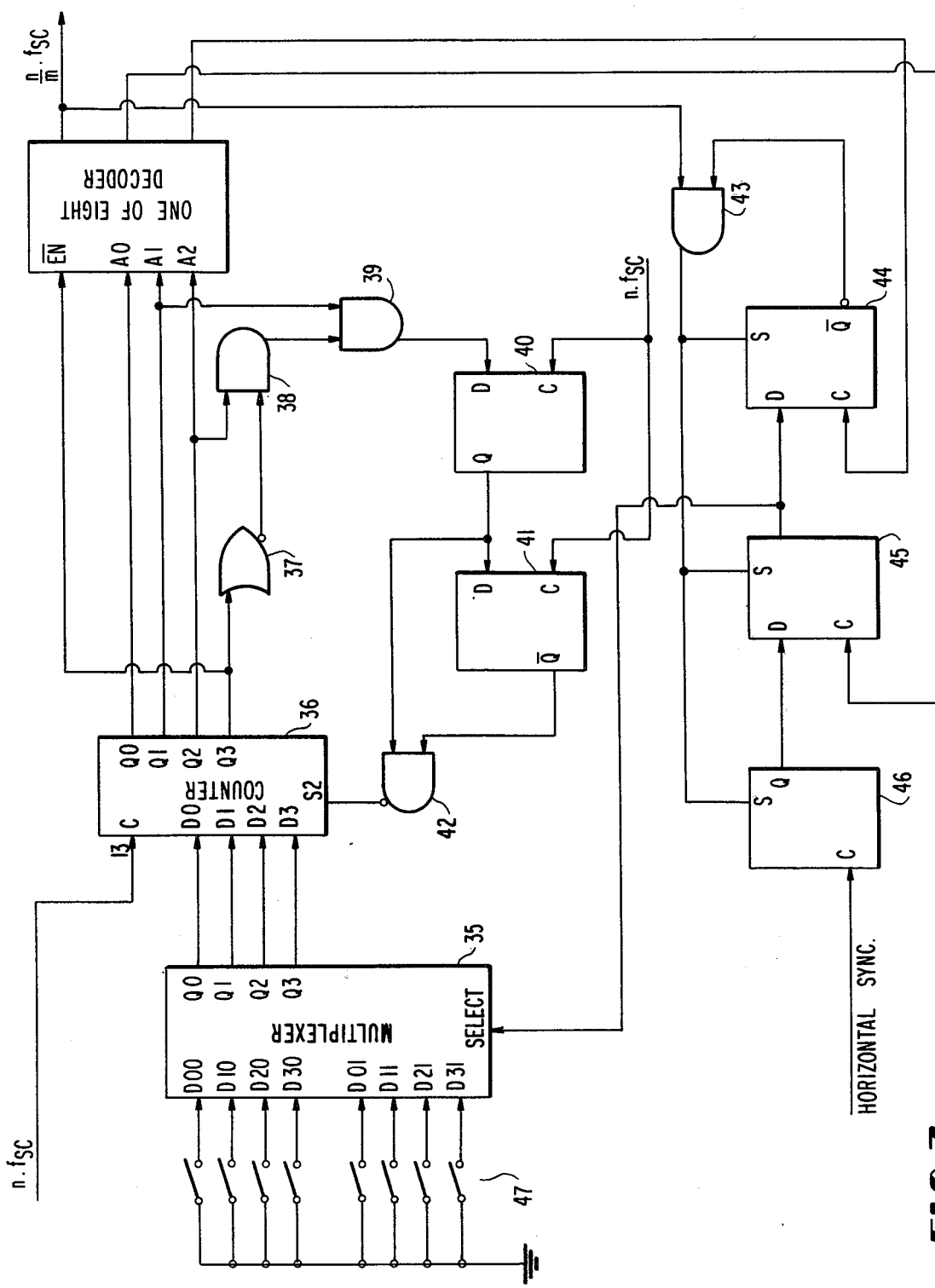
FIG. 7 is a circuit diagram of the decoder and "divide by m" counter portions of FIG. 4.

It will be understood by one of ordinary skill in the art that several types of counters and/or decoders may be used to achieve the above results. Purely by way of example, FIG. 7 is a circuit diagram of a possible decoder and divide by m counter which may be used in the device of FIG. 4. All of the part and page numbers given hereinbelow are obtained from the publication entitled MECL Integrated Circuits, Vol. 4, Series A, *Semiconductor Data Library*, Motorola, Inc., 1974. The system shown in FIG. 7 includes multiplexer 35 (MC10173, page 3-165), counter 36 (MC10136, page 3-101) NOR gate 37 (MC10101, page 3-5), AND gates 38, 39, 42 and 43 (MC10104, page 3-13), and flip-flops 40, 41, 44, 45 and 46 (MC10131, page 3-79). For a sampling rate of $(24/10)f_{sc} = (12/5) f_{sc}$ the master clock 16, in FIG. 4, generates pulses at a rate of $24f_{sc}$ and supplies these to the clocking terminals of counter 36 and flip-flops 40 and 41. Each time that counter 36 is clocked and a preset level is present at terminal $S_2$ of the counter, the counter 36 is preset to the binary number presented at terminals $D_0-D_3$ of the counter. The timing of the preset level is controlled by NOR gate 37, AND gates 38, 39 and 42 and flip-flops 40 and 41, with AND gate 42 producing a preset level whenever flip-flop 40 is set and flip-flop 41 is reset. This will occur only when the binary output of counter 36 corresponds to the number 7 (i.e., $Q_0$, $Q_1$ and $Q_2$ are "1" and $Q_3$ is "ZERO"). The number to which counter 36 is preset is dialed on switch 47 and fed to counter 36 via multiplexer 35 which is controlled by flip-flops 44, 45 and 46. Two separate 4-digit binary numbers $D_{00}-D_{30}$ and $D..._{-D31}$, respectively, are dialed on switch 47 and the state of the SELECT terminal determines which of these numbers is presented at output terminals $Q_0-Q_3$ of the multiplexer 35. Usually input terminals $D_{00}-D_{30}$ are selected and the counter 36 is preset to that binary number and the count in counter 36 continues from that point until a count of seven is reached, at which point the counter is again preset and the one-of-eight decoder 48 (MC10162) generates a sampling pulse. For a sampling rate of $(24/10)f_{sc}$, a "divide by 10" function must be achieved and, therefore, the number "14" must be dialed at terminals $D_{00}-D_{30}$ of switch 47. This will provide "divide by 10" operation since the counter output will follow the sequence .., 14,15,0,1,2,3,4,5,6,7,14,15,0,1,2, .... Once every horizontal blanking period flip-flop 46 is clocked so that the numbler dialed at terminals $D_{01}-D_{31}$ of multiplexer 35 are selected at the multiplexer output. If no phase adjustment is desired, $D_{00}-D_{30}$ and $D_{01}-D_{31}$ will have the same value. However, when an adjustment of k master clock pulses is desired the number at terminals $D_{01}-D_{31}$ must be k less than the number at $D_{00}-D_{30}$, in our example 14-k. For example, in the example shown in FIG. 3, $k=1$ and the number at $D_{01}-D_{31}$ must be (14-1) or 13. Thus, when the number at $D_{01}-D_{31}$ is selected during each horizontal blanking period, the next preset level at S2 of the counter 36 will cause the counter 36 to be preset to 13 so that the next sampling pulse, which occurs for a counter value of "7" will be delayed by one master clock pulse. That sampling pulse will set flip-flops 44-46 so that for the remainder of the line the number at $D_{00}-D_{30}$ will be selected. Note that the counter 36 is not preset until it reaches a count of "7". Thus, whatever value is contained in the counter at the end of a line will be carried over and continued at the beginning of the next line. This means that often the first sampling pulse on a line will not be phase shifted, but it will occur during the blanking period and will not affect the predictions.

It will be understood by one skilled in the art that logic circuitry could be designed which would cause the counter 36 to be preset to zero when a value of k is detected once during the horizontal blanking period so that all succeeding sampling pulses on the current line will be delayed by k master clock pulses.

The desired number k can be determined as follows: The color subcarrier frequency $f_{sc}$ is $$f_{sc} = 455/2 \times f_H \qquad (3)$$

where $f_H$ is the line frequency. The number of master clock pulses per line is $$CL = 455/2 \times n \qquad (4)$$

CL must be an integer or, due to the 180° phase shift of the color subcarrier between adjacent lines, the master clock pulses of adjacent lines will be interleaved and the second prediction method, described hereinbelow, will be rendered impossible. For CL to be an integer, n must be even. For a sampling rate of $(n/m)f_{sc}$, the number of samples per line is $$SL = 455/2 \times n/m \qquad (5)$$

Since there are n/m samples for each subcarrier period, the distance between samples, expressed in subcarrier degrees, is $360 \times m/n$. The number of samples of per line, SL, is not necessarily an integer. By defining ISL to be the largest integer such that ISL $\leq$ SL, the fraction of a sampling period remaining at the end of a line is SL − ISL, and the fraction of a sampling period carried over to the next line is 1 − (SL−ISL). This carry-over causes a displacement of the samples of one line with respect to the samples of the previous line. The displacement D expressed in subcarrier degrees is $$D = 360 \times (m/n)[1 - (SL-ISL)] = (360/n)[m - (n \times SL) + (M \times ISL)] \qquad (6)$$

Now, m × SL is the number of master clock pulses per line and is an integer for an even n. Also, m × ISL is the number of pulses per ISL sample and is likewise an integer. Therefore, [m−(mx × SL) × (m × ISL)] is an integer. In order to obtain the minimum distance between samples having the same subcarrier phase, the displacement D should be 180°. This can be achieved by adjusting the phase of the sampling pulses on line i+1 by $(360/m) \times k$ such that $$D = 360 \times (m/n)[1 - (SL-ISL)] + [360 \times k/n] = 180° \qquad (7)$$

Solving for k gives $$k = (n/2) - [m + (m \times SL) - (m \times ISL)] \qquad (8)$$

In order for k to be an integer, n must be even. An illustration of the aforedescribed method of minimizing the distance between co-phased subcarrier samples is given by the following example.

EXAMPLE 1

For a sampling rate of $(12/5) \times f_{sc}$, the following values are obtained $n = 12$ $m = 5$ $SL = (455/2) \times (12/5) = 546.0$ $ISL = 546 \qquad (9)$ Inserting the above values into the Equation (8) results in $$K = (12/2) - 5 + 0 = 1 \qquad (10)$$

Thus, setting the preset switch 26 to a value of k = 0001 will result in the sampling pulses for line i+1 in FIG. 2 being phase shifted by an increment $d_5$ = 1 master clock period.

Figure 5:
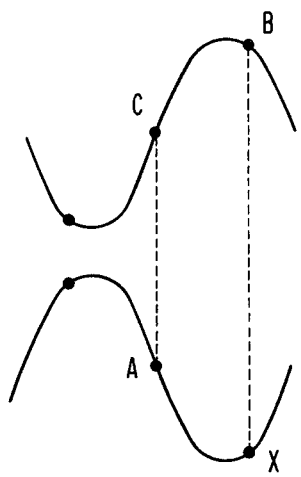
FIG. 5 illustrates samples from adjacent field lines which have been vertically aligned.

A second method of predicting NTSC color composite signals requires that the samples from adjacent field lines be vertically aligned as shown in FIG. 5. With reference to FIG. 5 it will now be shown that the value of a current sample X can be accurately predicted by the following equation:

$$\hat{X} = A + C - B \qquad (11)$$

where X, A, B and C are as defined above following Equation (1). Operation of the DPCM system of FIG. 1 according to Equation (5) can be obtained by providing three shift registers SR1-SR3, where SR1 is a 1-bit shift register for storing only the previous sample A, SR2 is an (SL)-bit shift register for providing sample B at its output, and SR3 is a (SL+1)-bit shift register for providing sample C at its output. Weighting coefficients $a_1$-$a_3$ are then set to 1, −1 and 1, respectively.

Figure 6:
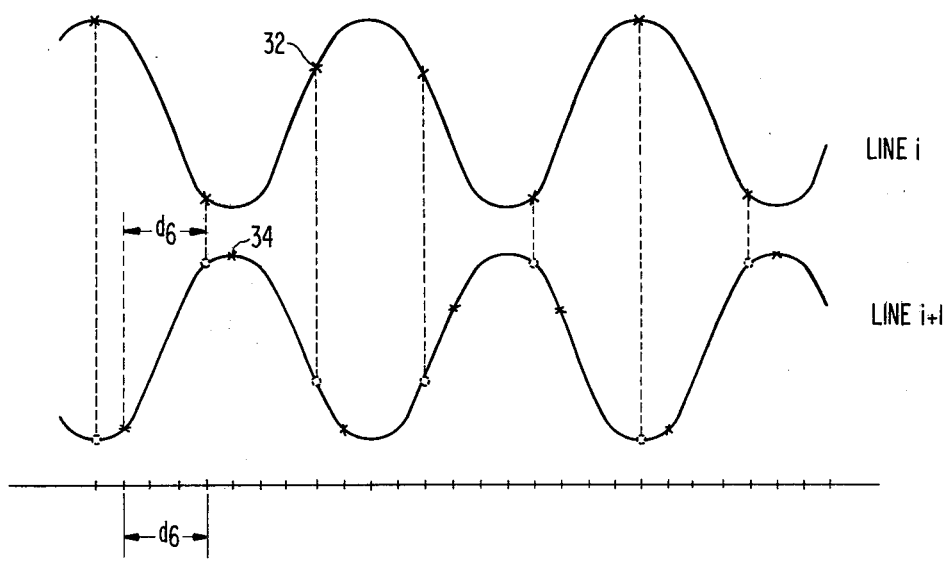
FIG. 6 illustrates the spatial distribution and phase relation of samples between adjacent field lines for a sampling rate of (8/3) × $f_{sc}$ before and after adjusting the phase of the samples according to the method of the present invention.

When samples of NTSC color composite signals are vertically aligned, the color subcarrier phase difference between any two vertical samples is 180° so that if the chrominance at pels A, B, C and X is the same, the chrominance components of pels A and C and pels X and B, respectively, will be equal in amplitude but opposite in sign. Hence, assuming pels X, A, B and C have the same chrominance, equation (11) becomes:

$$\hat{X} = Y_A + Y_C - Y_B - D\sin\phi \qquad (12)$$

where $Y_i$ and $D\sin\phi$ are as defined above. As in the first prediction method described above, the ideal case would have the luminance components of all samples being equal so that Equations (11) and (12) would reduce to $\hat{X} = -B$. However, the term $(Y_A + Y_C)$ will provide some compensation for the change in the luminance signal between lines i and i+1. As shown in FIG. 6, the samples in line i+1 must be phase shifted by a distance $d_6$ in order to achieve vertical alignment of the samples from adjacent lines. The phase shifting of the samples is performed in the same manner as in the first prediction method described above, except that for vertical alignment, the horizontal distance between samples on adjacent lines should be 0° or an integral multiple of the color subcarrier period which is (m/n) 360. This can be achieved by adjusting the phase of the sampling pulses between lines by $(360/n) \times k$. The displacement becomes $$D = 360(m/n)(1 - SL + ISL) + 360(k/n) \qquad (13a)$$

$$= 360(m/n)(1 - SL + ISL + (k/m)) \qquad (13b)$$

In order for the distance D to be an integral multiple of the subcarrier frequency, the value in parenthesis in Equation (13 b) must equal an integer. For example $$1 = (1 - SL + ISL + (k/m)) \qquad (14a)$$

Solving for k gives $$k = m(SL - ISL) \qquad (14b)$$

An illustration of the above-described method of vertical alignment is given by the following example.

EXAMPLE 2

For a sampling frequency of $(10/4) \times f_{sc}$, the following values are obtained $$n = 10$$

$$m = 4$$

$$SL = (455/2) \times (10/4) = 568.75$$

$$ISL = 568 \tag{15}$$

Inserting the above values in Equation (14b) results in k = 3 and, therefore, setting the preset switch 26 in FIG. 4 to a value of 3 will cause the first sampling pulse in line i+1 to be delayed by an increment of three master clock periods in order to achieve vertical alignment between samples 32 and 34, and so forth, as shown in FIG. 6.

The above-described methods of sampling the color subcarrier can be used not only for obtaining predictions in DPCM encoding, but also for error concealment in DPCM decoding. Since the accuracy of each DPCM encoded value in a field line depends upon the values of the previous samples, a transmission error during a line will be propagated to the end of the field line, thereby becoming quite visible on the television screen. Therefore, when a transmission error, e.g., signal dropout, is detected, it is advantageous to substitute the predicted value in place of the absent DPCM encoded value in order to conceal the transmission error.

The main features of the two predictors presented herein are their virtual independence of the sampling rate and simple hardware implementation. The only limitation on the sampling rate $(n/m) f_{sc}$ is that n be an even integer.

The above-described prediction methods are compatible with both PAL and NTSC signals and using either of the prediction methods will allow samples to be taken at rates less than $3f_{sc}$ while still maintaining the optimum phase relationships between samples on adjacent field lines. Decreasing the sampling rate contributes to either a lower transmission bit rate for a given picture quality or a better picture quality for a given bit rate.

It will be obvious to those skilled in the art that many changes and modifications may be made in the embodiments of the invention herein described without departing from the invention in its broadest aspects. For example, random access memories could be used in place of shift registers SR2 and SR3 and the proper samples could be retrieved from the memories by a computer. It is, therefore, to be understood that the appended claims are intended to cover this and all such modifications and changes as fall within the true spirit and scope of my invention.

What is claimed is:

1. In a method of predicting a color television signal having a color carrier frequency $f_{sc}$, of the type wherein consecutive lines of said signal are sampled at a frequency in excess of the Nyquist rate, the sample values are stored and a plurality of stored sample values are algebraically combined to obtain a predicted value of a current sample, the improvement comprising:
    sampling said television signal at a rate of $(n/m) f_{sc}$, where n and m are integers, and n is an even number; and
    phase-shifting the sampling times of each line of said signal relative to the sampling times of the prior line of said signal.

2. The method of predicting a color television signal according to claim 1 wherein said sampling times are phase-shifted by an amount which is an integral multiple of (1/n) times the color subcarrier period.

3. The method of predicting a color television signal according to claim 2 wherein said sampling times are phase-shifted in order to obtain a horizontal distance of one-half the subcarrier period between samples on consecutive lines having the same subcarrier phase.

4. The method of predicting a color television signal according to claim 3 wherein said plurality of stored values comprises samples values B and C from said prior line of said signal and sample value A from the current line of said signal, and wherein the prediction $\hat{X}$ of the current sample value X is calculated according to the equation $$\hat{X} = B + \tfrac{1}{2}(A - C)$$

where samples X and A have the same subcarrier phase as samples B and C, respectively.

5. The method of predicting a color television signal according to claim 4 wherein said color television signal is a NTSC color composite signal.

6. The method of predicting a color television signal according to claim 2 wherein said sampling times are phase-shifted in order to vertically align samples from consecutive lines.

7. The method of predicting a color television signal according to claim 6 wherein said plurality of stored values comprises sample values B and C from said prior line of said signal and sample value A from the current line of said signal, and wherein the prediction $\hat{X}$ of the current sample value X is calculated according to the equation $$\hat{X} = A + C - B$$

where samples X and A are vertically aligned with samples B and C, respectively.

8. The method of predicting a color television signal according to claim 7 wherein said color television signal is a NTSC color composite signal.

9. The method of predicting a color television signal according to claim 2 wherein said sampling times are defined by sampling pulses from a timing means, said timing means comprising:
    master clock means phase-locked to $f_{sc}$ for providing master clock pulses at a rate of $nf_{sc}$;
    a "divide by m" counter connected to receive said master clock pulses and providing sampling pulses at a rate of $(n/m)f_{sc}$; and
    decoding means, enabled once during each horizontal blanking period, for providing a preset pulse at the beginning of the current line of said signal when a count of k is detected in said divide by m counter, whereby said preset pulse simultaneously disables said decoder and resets said divide by m counter to zero so that the sampling pulses on said current line, which occur thereafter at every $m^{th}$ master clock pulse, are phase-shifted by k master clock pulses relative to the sampling pulses of the prior line.

10. The method of predicting a color television signal according to claim 2 wherein said sampling times are defined by sampling pulses from a timing means, said timing means comprising:

master clock means phase-locked to $f_{sc}$ for providing master clock pulses at a rate of $nf_{sc}$;

counting means connected to receive said master clock pulses;

a decoder providing a sampling pulse each time a count of I is reached in said counting means first preset means for presetting said counter to a value of $(-J)$ when a count of I is reached in said counting means, where $m = (I + J)$, thereby providing "divide by m" operation; and second preset means for presetting said counter to a value of $(-J-k)$ once during each horizontal blanking period when a count of I is reached in said counter so that the next sampling pulse will occur after $(m + k)$ master clock pulses and the sampling times on said current line, which occur thereafter at every $m^{th}$ master clock pulse, are phase-shifted by k master clock pulses relative to the sampling pulses of said prior line.

* * * * *